US012569944B2

(12) United States Patent
Coughlin et al.

(10) Patent No.: US 12,569,944 B2
(45) Date of Patent: Mar. 10, 2026

(54) LASER WELDING TOOLING AND LASER WELDING SYSTEMS

(71) Applicant: BAE Systems Controls Inc., Endicott, NY (US)

(72) Inventors: Jeffrey E. Coughlin, Endicott, NY (US); Peter J. Arnold, Endicott, NY (US); Joseph W. Sienko, Apalachin, NY (US); Matthew S. Boecke, Endicott, NY (US); Joshua P. Stewart, Vestal, NY (US)

(73) Assignee: BAE Systems Controls Inc., Endicott, NY (US)

( * ) Notice: Subject to any disclaimer, the term of this patent is extended or adjusted under 35 U.S.C. 154(b) by 48 days.

(21) Appl. No.: 18/160,571

(22) Filed: Jan. 27, 2023

(65) Prior Publication Data

US 2024/0253167 A1      Aug. 1, 2024

(51) Int. Cl.
 *B23K 37/04* (2006.01)
 *B23K 31/12* (2006.01)
 *B23K 101/36* (2006.01)

(52) U.S. Cl.
 CPC ........ *B23K 37/0426* (2013.01); *B23K 31/125* (2013.01); *B23K 2101/36* (2018.08)

(58) Field of Classification Search
 CPC ............ B23K 2101/18; B23K 2101/36; B23K 26/0661; B23K 26/082; B23K 26/244; B23K 26/28; B23K 26/70; B23K 26/702; B23K 37/0443
 USPC ....................................................... 219/158
 See application file for complete search history.

(56) References Cited

U.S. PATENT DOCUMENTS

| | | | | |
|---|---|---|---|---|
| 6,719,186 B2 * | 4/2004 | Mudge, Jr. ............. | B23K 37/06 | 228/175 |
| 2009/0273886 A1 * | 11/2009 | Miura .................... | H01G 9/008 | 361/518 |
| 2010/0062329 A1 * | 3/2010 | Muis ................... | H01M 10/486 | 429/158 |
| 2011/0244283 A1 * | 10/2011 | Seto .................... | H01M 50/227 | 429/91 |
| 2013/0157115 A1 * | 6/2013 | Kobayashi ........ | H01M 10/6557 | 429/160 |

(Continued)

FOREIGN PATENT DOCUMENTS

WO         2022/072641 A1      4/2022

OTHER PUBLICATIONS

International Search Report, PCT/US24/12527, mailed May 22, 2024, 7 pages.

*Primary Examiner* — Chris Q Liu
(74) *Attorney, Agent, or Firm* — Scully Scott Murphy & Presser PC; Gary McFaline

(57) ABSTRACT

Welding plates and a welding system are provided. A welding plate comprises a first portion and a second portion. The first portion comprises a plurality of recesses. Each recess comprises an elastomer configured to compress under a force and a tip. A proximal end of the tip is in contact with the elastomer. The elastomer has a durometer rating less than a predetermined threshold. The second portion may be mounted to the first portion. The second portion has a plurality of first openings. Each first opening corresponds to a recess. A respective tip extends through a respective first opening. Each tip is slidably mounted within the welding plate. Each tip has a central opening forming a welding channel.

16 Claims, 13 Drawing Sheets

(56)                    References Cited

U.S. PATENT DOCUMENTS

2014/0212695 A1 *   7/2014   Lane ................... H01M 50/519
                                                      429/7
2015/0214524 A1 *   7/2015   Takasaki ............ H01M 50/291
                                                      429/82
2017/0005315 A1 *   1/2017   Harris ................ H01M 10/425
2017/0005371 A1 *   1/2017   Chidester ............. H01M 50/20
2017/0018750 A1 *   1/2017   Wintner ............. H01M 50/522
2017/0194610 A1 *   7/2017   Tschiggfrei ........ H01M 50/503
2017/0256771 A1 *   9/2017   Buckhout ......... H01M 10/4257
2017/0271642 A1 *   9/2017   Groshert ............ H01M 10/482
2017/0288202 A1 *  10/2017   Tarlau ................ B23K 26/362
2020/0060022 A1 *   2/2020   Schneider ........... H05K 1/0209
2021/0391602 A1     12/2021  Kennedy et al.
2022/0134491 A1      5/2022  Inoue et al.
2023/0022699 A1 *    1/2023  Kühl ...................... G02B 6/262

* cited by examiner

Z-Direction

X-Direction

Y-Direction

Fixturing 200

Capture Plate 14

Welding Plate 10

Isolators 206

Mounting Bolts 205

Bus Bar 12

Tab 12A

Elbow 12B

Fixturing 200

Fixturing 200

Capture Plate 14

Welding Plate 10

Backer Plate 15

Location Mount 250

X-Direction

Recesses 24

Mounting Opening 22

Y-Direction

Base 20

Mounting Opening 22

Openings 26

Screw Holes 23

Base 20

Alignment Pin 28

Recesses 24

Mounting Opening 22

D1

Base 20

Fig. 4B

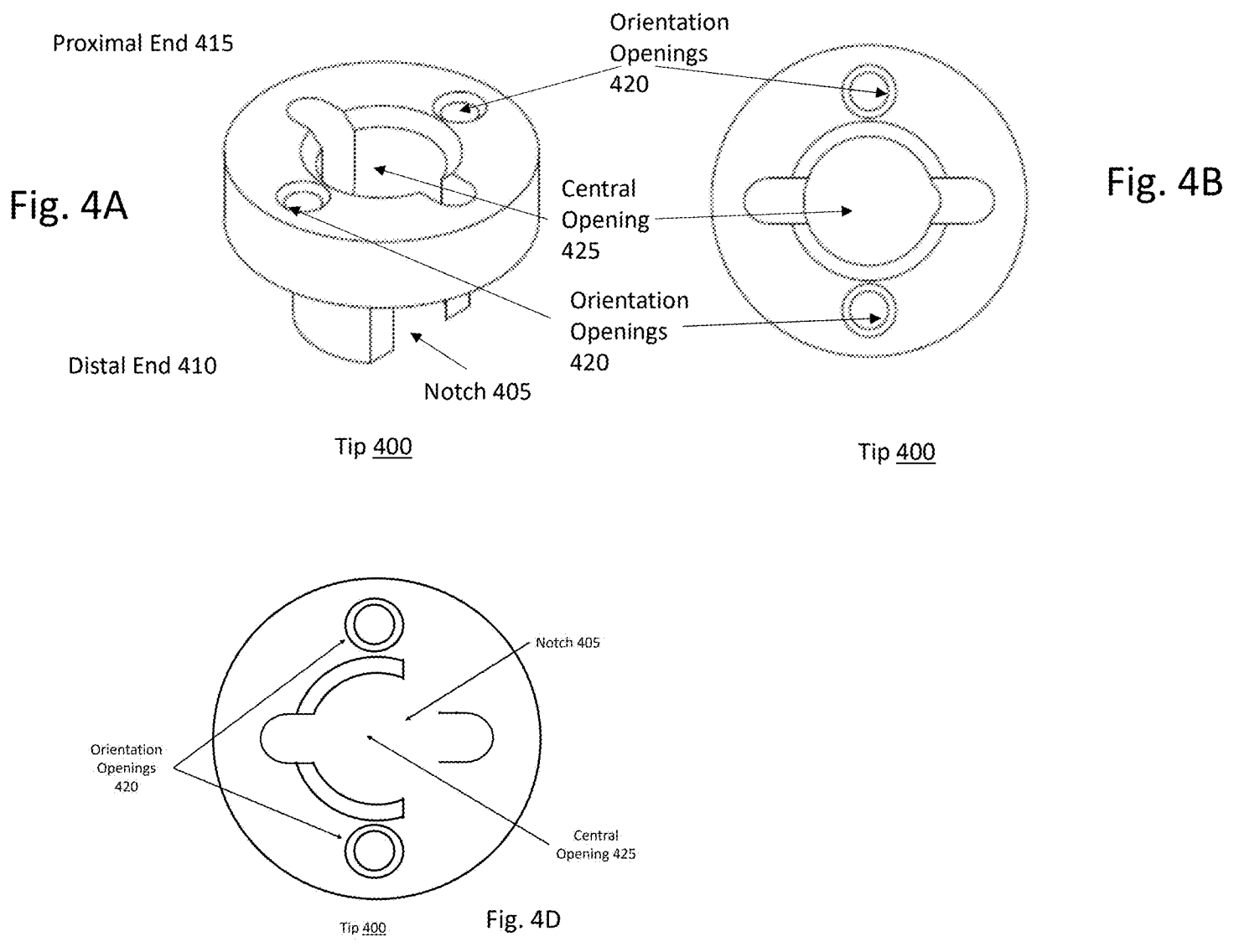

Tip 400

Orientation
Openings
420

Central
Opening
425

Orientation
Openings
420

Notch 405

Tip 400

Proximal End 415

Distal End 410

Fig. 4A

Notch 405

Central
Opening 425

Orientation
Openings
420

Tip 400

Fig. 4D

Elastomer Spacer

500

Openings 42

Cover 40

Screw
Holes
23

D2

Second Orientation 710 (ROW 7, 8)

First Orientation 705 (ROW 5, 6)

Second Orientation 710 (ROW 3, 4)

First Orientation 705 (ROW 1, 2)

Row of Tips 700

Tip 400

Isolators 206

Welding Plate 10

Fixed Tip 900

Backer Plate 15

LASER WELDING TOOLING AND LASER WELDING SYSTEMS

FIELD OF THE DISCLOSURE

This disclosure relates to laser welding and more particularly tooling such as welding plates and a welding system for welding bus bars to battery cells of an energy storage system.

BACKGROUND

Energy storage systems may have a plurality of individual battery cells, such as lithium-ions cells. The cells may be electrically connected in series and in parallel via bus bars. Each cell has two terminals. The terminals of the cells are attached to respective bus bars (or a set of respective bus bars). The terminals are typically attached via laser welding. Laser welding systems use plates to press the bus bars on the cells to have the bus bars contact the cells under pressure. However, each cell within the energy storage system may not have the exact same height. This may be due to tolerance in manufacturing of the cells. The different heights may cause uneven welding such that the electrical contact between the bus bar and certain cells are poor. A backer plate can be used on the opposite side of the cell to ensure even cell height on the welding side of the cell.

SUMMARY

Accordingly, disclosed are welding plates having a plurality of tips which are moveable based on the heights of individual cells within an energy storage system.

A welding plate comprises a first portion and a second portion. The first portion comprises a plurality of recesses. Each recess comprises an elastomer configured to compress under a force and a tip. A proximal end of the tip is in contact with the elastomer. The elastomer has a durometer rating less than a predetermined threshold. The second portion may be mounted to the first portion. The second portion has a plurality of first openings. Each first opening corresponds to a recess. A respective tip extends through a respective first opening. Each tip is slidably mounted within the welding plate. Each tip has a central opening forming a welding channel.

In an aspect of the disclosure, the first portion may further comprise a plurality of second opening. Each second opening corresponds to a recess. Each second opening may be aligned with the central opening of the tip. Each second opening forming a welding channel. Each second opening and the central opening of the tip may further comprise an extended section configured to receive light from a monitoring laser for monitoring a quality of a weld.

In an aspect of the disclosure, the distal end of the tip has a horse-shoe shape and may have a notch region. A distal surface of the distal end may be configured to engage a tab of a bus bar when welding. A proximal end of the notch region may be positioned above the bus bar.

In an aspect of the disclosure, the welding plate may be used to weld bus bar(s) to cell(s) of an energy storage system. In this aspect, the tip may contact the bus bar, respectively, under a pressure of a backer plate when the welding plate is secured. Each tip slides within a corresponding recess and the elastomer is compressed. The amount of sliding is based on height(s) of the corresponding cell(s).

In an aspect of the disclosure, the predetermined threshold may be a shore A rating of 75.

In an aspect of the disclosure, the tip may be mounted in one of a first orientation or a second orientation. The orientation may be based on the welding target. In an aspect of the disclosure, a wall of each tip may comprise at least one opening. Each recess may comprise an alignment pin. When a tip is inserted into the recess, the alignment pin may be inserted into the opening in the wall of the tip defining the orientation.

In an aspect of the disclosure, each tip in a same row of the welding plate has the same mounting orientation. In another aspects, the orientation of the tips alternates every preset number of rows of tips.

In an aspect of the disclosure, the tip may be formed on a non-metallic material. In an aspect of the disclosure, the tip may be formed of the same material as the first portion.

In an aspect of the disclosure, the welding plate may have third openings. Each third opening may be configured to receive a fixing device to secure the welding plate to a target fixturing.

Also disclosed is a welding system. The welding system may be for an energy storage system. The energy storage system may have a cell housing comprising a plurality of cell openings for holding a plurality of cells, respectively. The plurality of cells may be mounted therein. The energy storage system may further have a first plurality of bus bars and a second plurality of bus bars. The welding system may comprise a first welding plate, a second welding plate, a backer plate and at least one monitoring plate or a welding laser.

The first welding plate comprises a first portion and a second portion. The first portion comprises a plurality of recesses. Each recess comprises an elastomer configured to compress under a force and a tip. A proximal end of the tip is in contact with the elastomer. The elastomer has a durometer rating less than a predetermined threshold. The second portion may be mounted to the first portion. The second portion has a plurality of first openings. Each first opening corresponds to a recess. A respective tip extends through a respective first opening. Each tip is slidably mounted within the welding plate. Each tip has a central opening forming a welding channel. The distal end of the tips, when the first welding plate is mounted to the energy storage system, is configured to contact the first plurality of bus bars. The first welding plate further comprises a plurality of second openings. Each second opening corresponds to a recess. Each second opening may be aligned with the central opening of the tip. Each second opening is configured and dimensioned to form a laser welding channel.

The backer plate comprises a plurality of substantially equal length projections corresponding to the tips. The backer plate, when mounted to the energy storage device is configured to contact the second plurality of bus bars.

In an aspect of the disclosure, the system may further comprise a second welding plate. Tips in the first welding plate and the second welding plate are mounted in a first orientation or a second orientation where both orientations are present in the first welding plate and the second welding plate. A tip in a same position in the first welding plate as a tip in the second welding plate may have different orientations.

In aspect of the disclosure, the tips of the second welding plate, when the second welding plate is mounted to the energy storage device, are configured to contact the second plurality of bus bars. The plurality of projections of the backer plate, when the backer plate is mounted to the energy storage device, is configured to contact the first plurality of bus bars.

In an aspect of the disclosure, the distal end of the tip has a notch region. A distal surface of the distal end of the tip is configured to engage a tab of the one of the first plurality of bus bars or the second plurality of bus bars and a proximal end of the notch region is above the same bus bar.

In an aspect of the disclosure, each second opening and the central opening of the tip may further comprise an extended section configured to receive light from the monitoring laser for monitoring a quality of a weld.

BRIEF DESCRIPTION OF THE DRAWINGS

FIG. 4A is a perspective view of a tip in accordance with aspects of the disclosure;

FIG. 4B is a view of the tip in accordance with aspects of the disclosure;

FIG. 4D is a view of the tip from the bottom in accordance with aspects of the disclosure.

DETAILED DESCRIPTION

Disclosed are welding plates 10 for creating intimate contact between bus bars 12 and respective cells 800 of an energy storage system (ESS) even where the cells have varying heights. The intimate contact enables good electric connection after laser welding.

Figure 1:
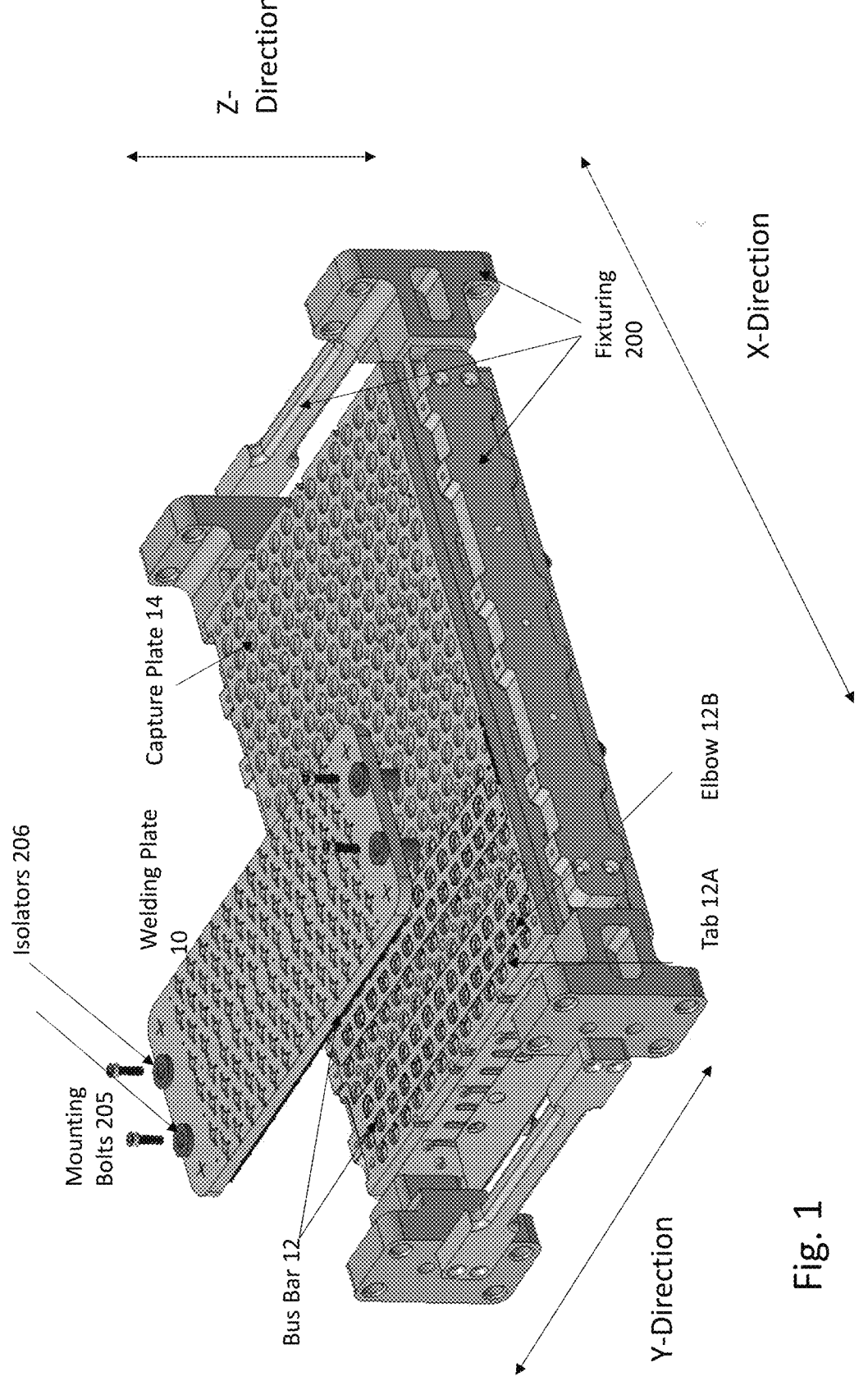
FIG. 1 is an exploded view showing a welding plate in accordance with aspects of the disclosure over an energy storage system where two bus bars are shown and fixturing is attached to the energy storage system for mounting plates for welding.
Figure 8:
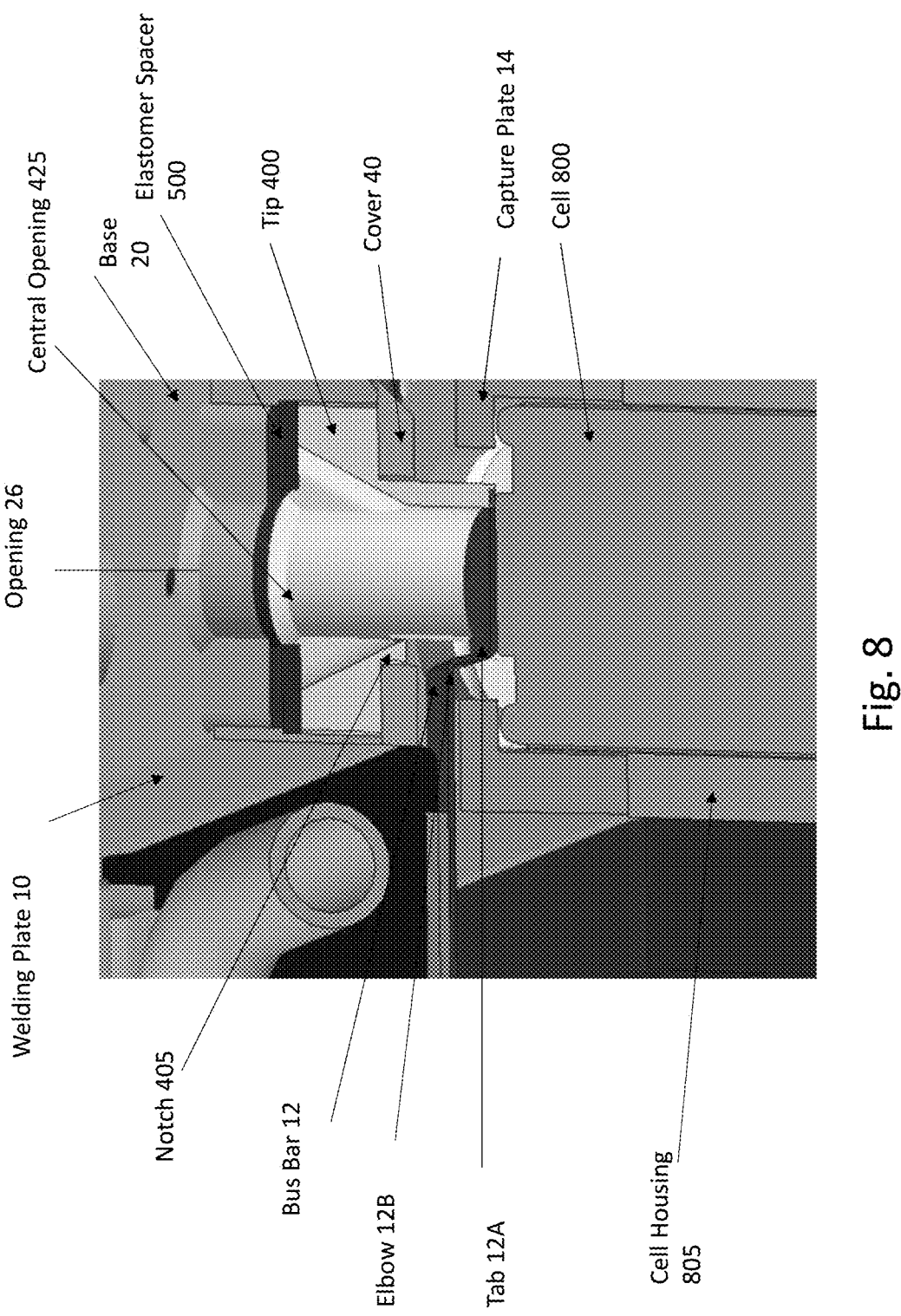
FIG. 8 is a section view showing the welding plate, bus bar and cell in accordance with aspects of the disclosure when the welding plate is mounted to the fixturing (not shown)

The ESS has a plurality of cells 800. The cells 800 may be arranged in a matrix (in an x and y direction). The cells 800 may be lithium-ion cells. Each cell 800 may have steel ends, e.g., positive and negative terminals. The cells 800 are arranged within cell housing 805 (shown in FIG. 8). The cell housing 805 has a plurality of openings arranged in the x and y direction and extending in the z-direction. In some aspects, the end of the cells 800 may project beyond the cell housing 805 into capture plates 14 (as shown in FIG. 8) (both ends). The ESS has capture plates 14 on both sides of the cell 800 in the z direction. The capture plates 14 also contain corresponding openings arranged in a matrix. Bus bars 12 are set into the openings in the capture plate 14 for welding and more particular, the tabs 12A of the bus bars are placed into the openings of the capture plate as shown in FIG. 1. A bus bar 12 may be made of aluminum. The specific pattern of the cells 800 and the number of cells 800 within the ESS may be based on the application for the ESS. For example, there may be more cells when the application is for a high voltage.

In an aspect of the disclosure, a single bus bar may be used for one side of the cells (in the z direction) and another single bus bar may be used for the other side (in the z direction). However, in other aspects of the disclosure, the bus bar may be sectional such as shown in FIG. 1. For example, one bus bar may be used for a sub set of rows of cells in the ESS. As shown in FIG. 1, one bus bar may be used for four rows of cells. Thus, for each side of the cells in the z direction, a set of bus bars 12 may be used, e.g., a first set of bus bars and a second set of bus bars.

For purposes of welding, fixturing 200 may be attached to walls of the ESS. The fixturing 200 may comprise posts on the corners, e.g., four posts. Two cross-bars may connect respective posts in the y-direction. The fixturing 200 may also have two beams in the longitudinal direction (x-direction) connecting the posts. The two beams may periodically have openings for isolators 206 on the welding plate 10 to be inserted. The number of isolators openings and spacing between the same may be based on the size of the welding plate 10 and number of rows of cells.

Figure 2:
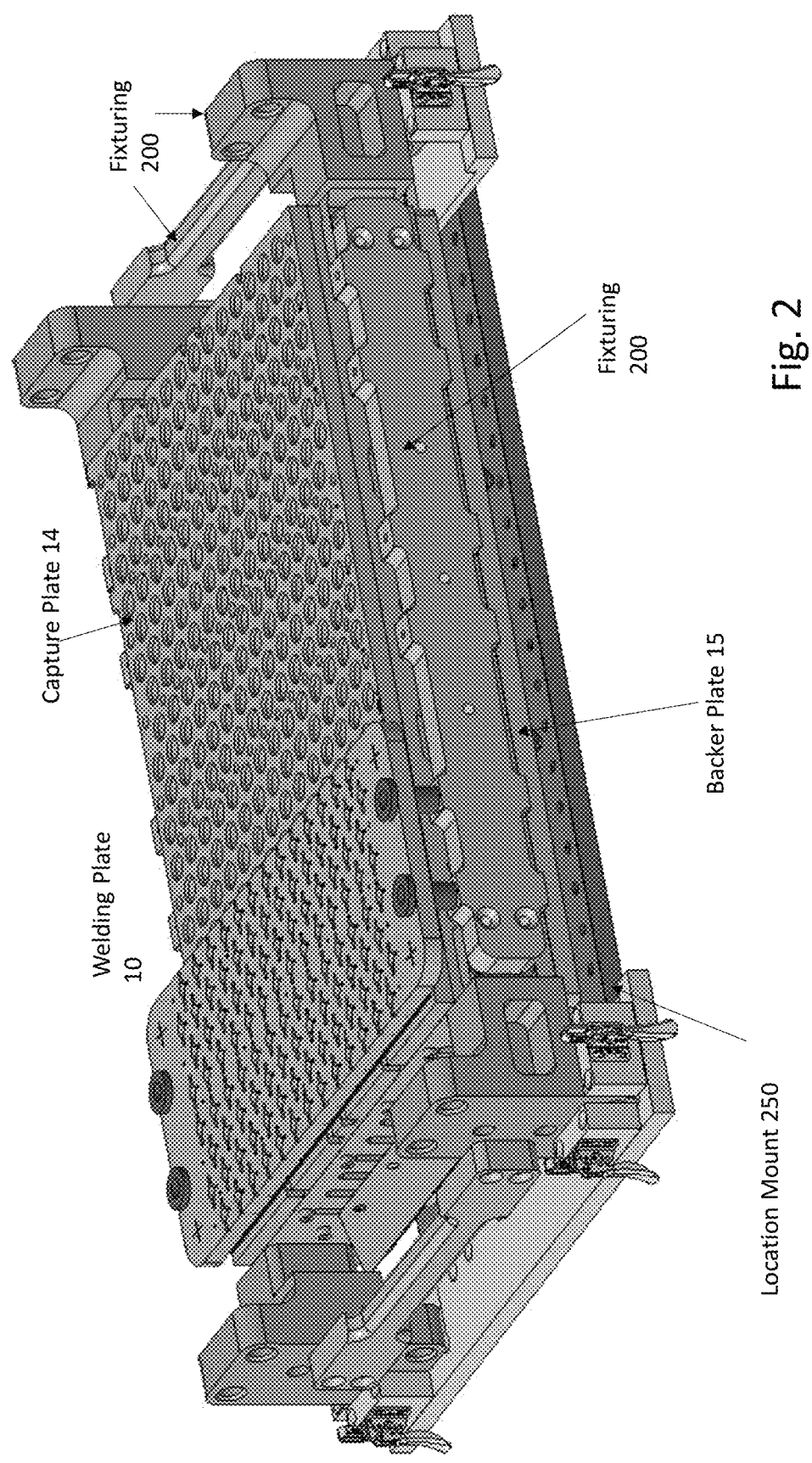
FIG. 2 is a view showing a welding plate in accordance with aspects of the disclosure mounted to the fixturing for welding where the energy storage system is mounted to a location mount.

As shown in the example in FIG. 1, the welding plate 10 has two isolators 206 on each end. An isolator 206 may be made of rubber and have an opening for bolts 205 to be inserted such that the head of the bolts is hidden within the isolator 206. Thus, the beams may have multiple sets of two isolator openings. When the welding plate 10 is mounted to the fixturing 200 (such as shown in FIG. 2), the isolators 206 are inserted into the respective isolator openings and mounting bolts 205 may be inserted. In some aspects, the isolator openings on the fixturing may have threaded holes in which a screw may be screwed into such that the plate may be secured to the fixturing 200. As such, other mounting hardware may be used such as screws to screw down the welding plate 10 onto the fixturing 200.

Multiple sets of isolator openings may be used because the welding plate 10 may not be as long as the ESS in the longitudinal direction (x-direction) and the welding process may be repeated to weld the set of bus bars to one side of the cells in the z-direction.

FIG. 1 shows, by way of example, two bus bars 12 for welding. However, more than two bus bars 12 may be used per side.

Figure 9:
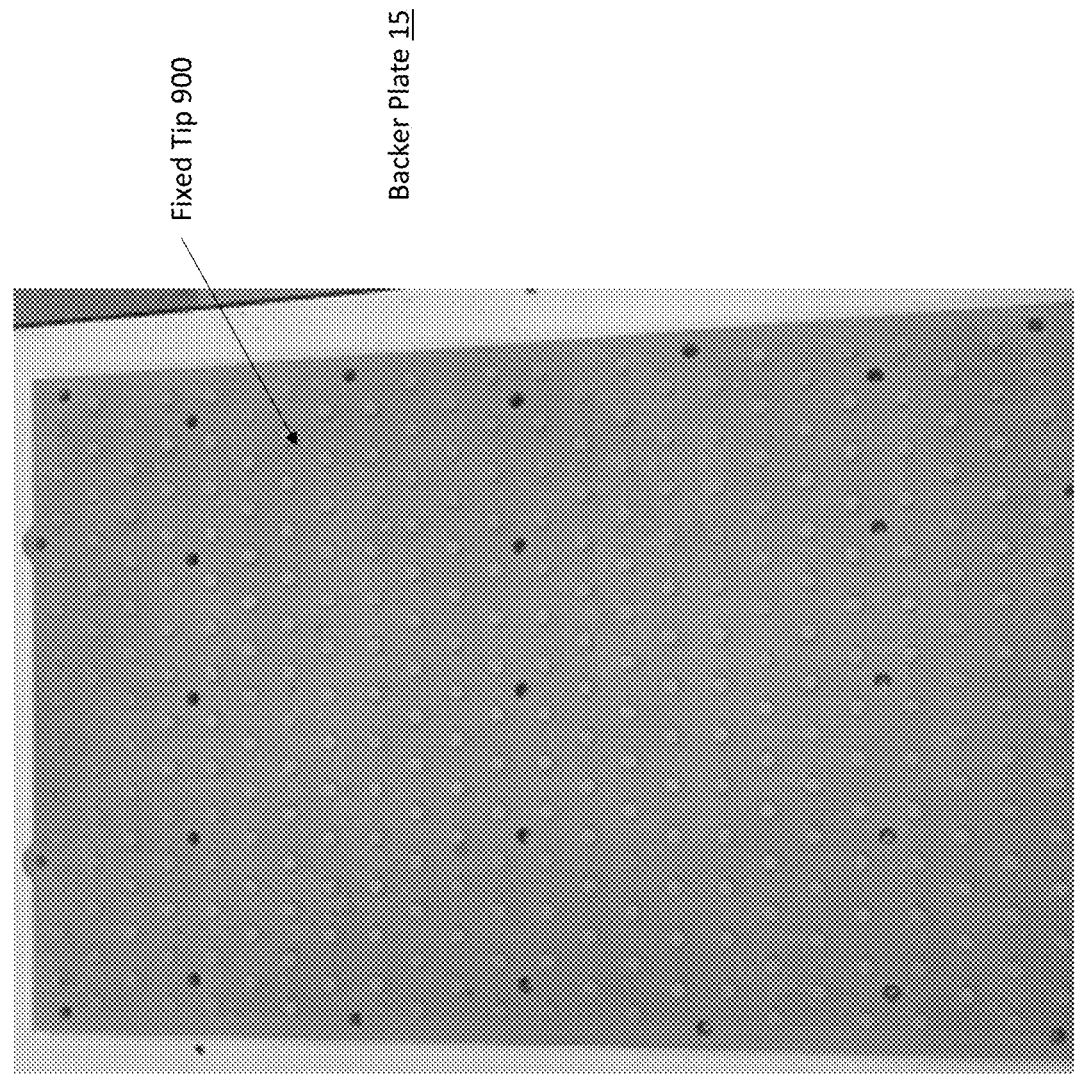
FIG. 9 shows an example of a backer plate in accordance with aspects of the disclosure.

FIG. 2 shows an example of the welding plate 10 mounted on the fixturing 200. In FIG. 2, the welding plate 10 is mounted on one side of the cells and a backer plate 15 (such as shown in FIG. 9) is mounted on the other side of the cells 800 in the z-direction. However, in some aspects of the disclosure, the backer plate 15 may extend the full longitudinal length (x-direction) of the cell housing 805 and therefore, once mounted, all of the bus bars in the set (for one side) may be welded without moving the backer plate 15. The backer plate 15 may be directly mounted to the cell housing 805 via openings in the housing.

For laser welding, the ESS/fixturing 200 is also mounted to a location mount 250 (fixture mount). The location mount 250 secures the fixturing 200 in place for welding by pushing the fixturing with the use of pusher blocks on 3 of the 4 corners to a fixed corner so the ESS is always in the same exact location. The posts of the fixturing 200 are inserted into grips of the location mount 250 and the grips are locked.

In an aspect of the disclosure, the welding plate 10 may comprise a base 20 (an example of a first portion), a cover 40 (an example of a second portion), elastomer spacers 500 and tips 400.

Figure 3A:
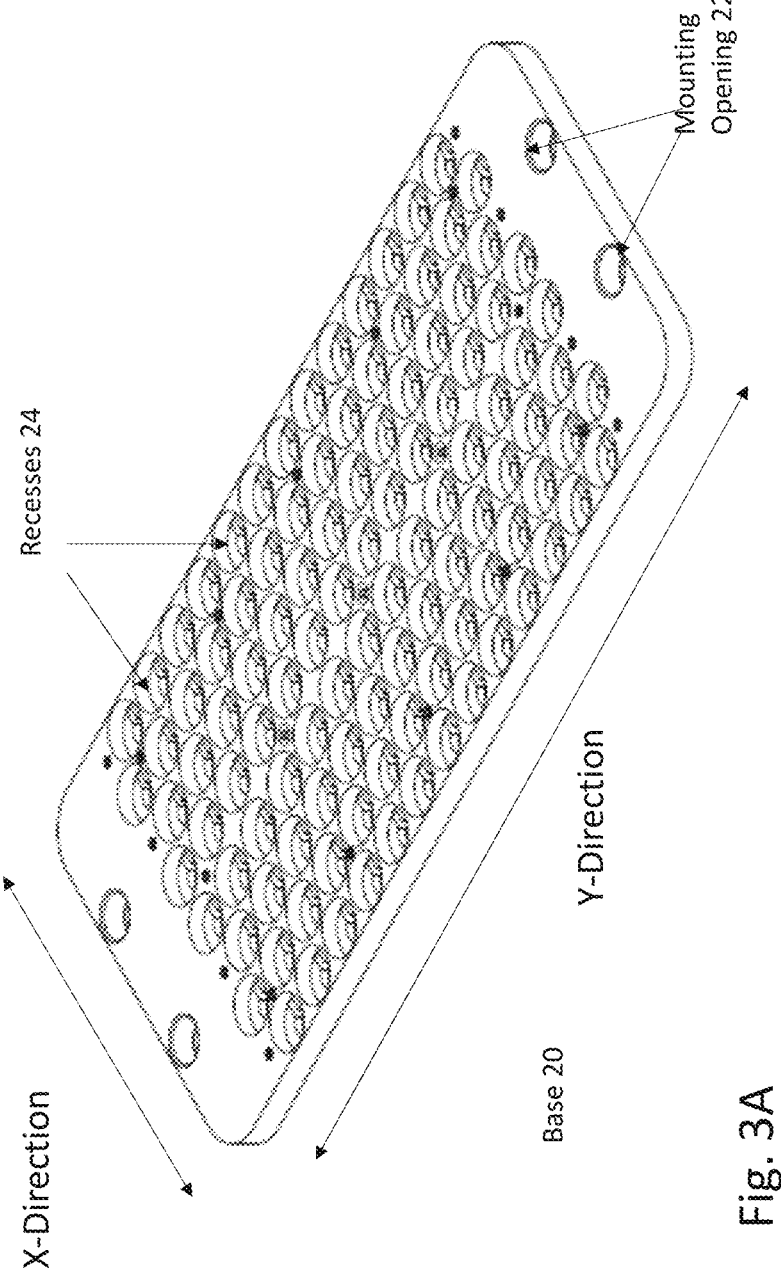
FIG. 3A is a perspective view of a base for a welding plate in accordance with aspects of the disclosure.
Figures 3B, 3C:
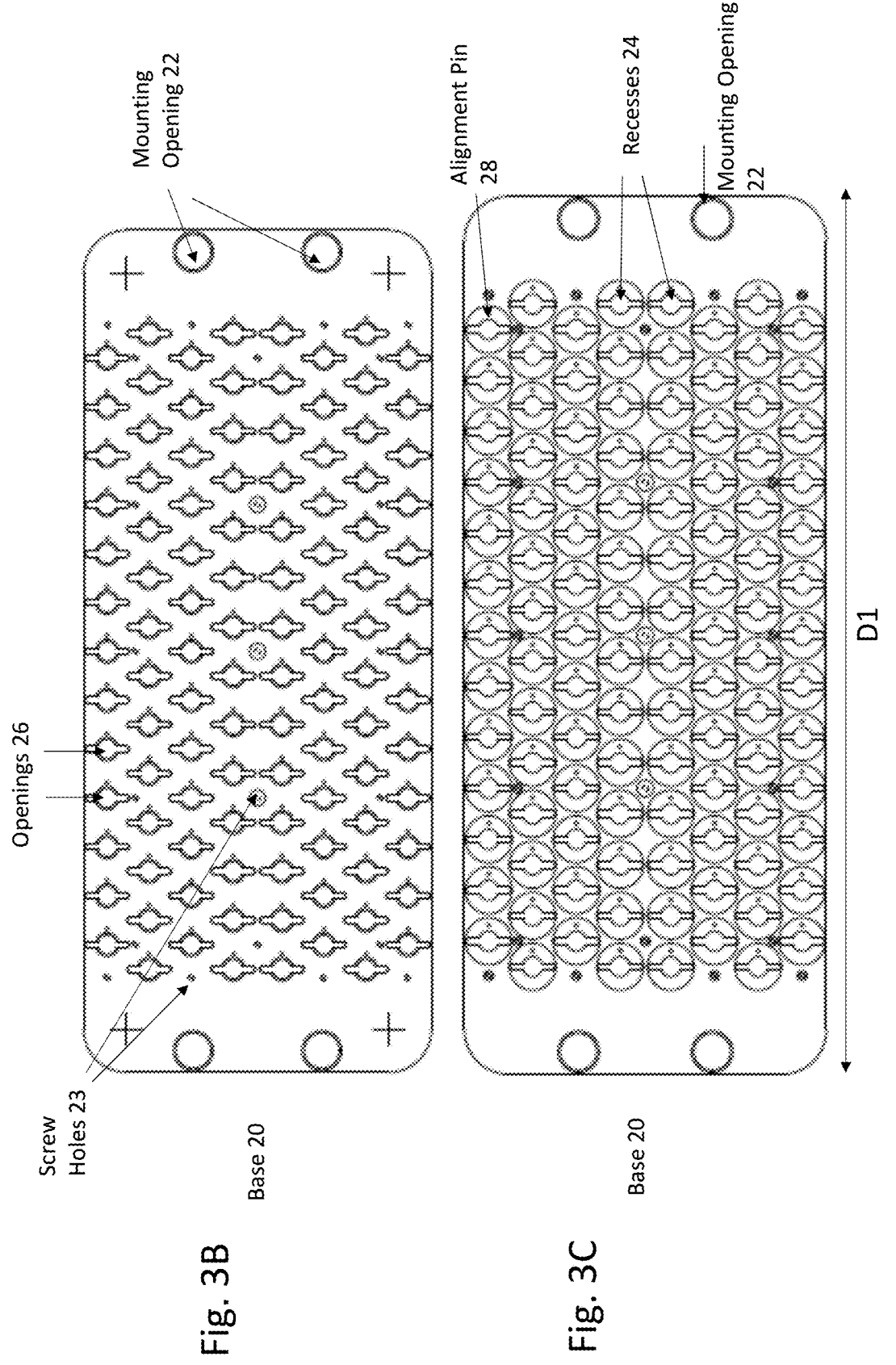
FIG. 3B is a view of the base for a welding plate in accordance with aspects of the disclosure.
FIG. 3C is an opposite view of the base for a welding plate in accordance with aspects of the disclosure.

FIGS. 3A-3C illustrate different views of an example of a base 20 in accordance with aspects of the disclosure. The base 20 may be manufactured via 3-D printing. The base 20 may be of a non metallic material. The use of the non-metallic material is preferable to avoid shorting during the welding process. The material may be a glass silicone composite laminate (G7 material). In other aspects, when a metallic material such as aluminum or steel are used, the material may be anodized. However, other materials may be used. The type of material for the base 20 may be selected based on the welding. For example, the material may be selected based on its thermal proprieties. Since the welding for different application may use different energies, such as 250 W, 500 W, and 1000 W, the base 20 may be make of a different material to withstand the heat generated by the laser 1000.

The base 20 may have a plurality of recesses 24. The recesses 24 may be arranged as a matrix in the x and y directions. The positions of the recesses 24 may correspond to positions of the cells 800. Thus, the particular pattern of the recesses 24 may be dependent on the positions of the cells 800 in the target ESS for welding.

Each recess 24 is dimensioned to receive an elastomer spacer 500 and a tip 400. Each recess 24 may have an alignment pin 28 (shown in FIG. 3C) projecting in the z direction from a wall of the base 20. As will be described later, the tips 400 may be inserted into the recces 24 in different orientations, e.g., a first orientation 705 or a second orientation 710. The alignment pin 28 can be inserted into a wall of the tip 400 to fix the tip in a particular orientation.

The ends of the base 20 (in the y-direction) have mounting openings 22 for mounting the plate 10 to the fixturing 200. The openings 22 extend in the z-direction from a first side (proximal side) to a second side (distal side). For purposes of the description the proximal side is the side closest to the lasers used in the welding and the distal side is the side closest to the bus bars 12 and cells 800, when mounted to the fixturing 200.

FIG. 3B is a view showing the first side of the base 20. The first side of the base 20 has a plurality of openings 26. Each opening 26 corresponds to a recess 24. A central part of the opening 26 has a generally circular shape. The opening 26 also has an extended portion, e.g., wings, extending from the central part of the opening. The central part of the opening provides a welding channel for energy (light) from a welding laser 1000 to travel through. Additionally, the central part of the opening may be used for a height sensor to determine the height of a cell 800. The light from the welding laser 1000 may enter the base 20 generally orthogonal. The extended portion (wings) provide a channel for energy (light) from weld monitoring laser 1005 to travel through and return from the bus bar 12/cells 800 such that the quality of the laser weld may be monitored.

The diameter of the central part of the opening may be set such that the light from the welding laser 1000 does not interact with the base 20. Additionally, the diameter of the central part may be set such that the welding plate 10 does not heat (overheat) by the welding laser 1000. The diameter may not be too larger such that the opening in the base 20 prevents the elastomer spacer 500 from being inserted into the recess 24, e.g., falling through the opening.

Figure 10:
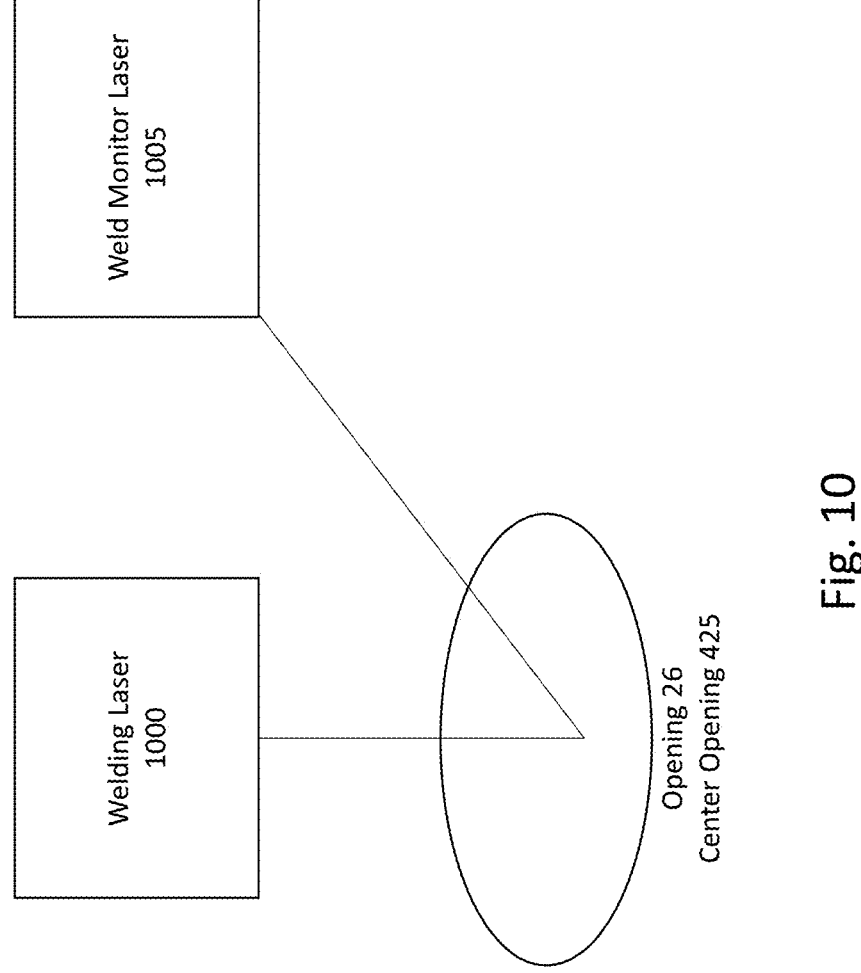
FIG. 10 shows lasers used for a laser welding system and relative positions with respect to openings in accordance with aspects of the disclosure.

As shown in FIG. 3C, which is a view from the second side of the base 20, the extended portion of the opening, extends from the central part to the edge of the recess 24, effectively cutting the recess 24 in half. This is also to allow the light through without interacting with base 20. As shown in FIG. 10, the light from the weld monitoring laser 1005 angled (approximately) 45° from the light entered from the welding laser 1000.

The base 20 also has a plurality of openings (screw holes 23) for mounting the cover 30 to the same (using screws or other mounting hardware).

An elastomer spacer 500 and a tip 400 are inserted into each recess 24. In an aspect of the disclosure, the elastomer spacer 500 may be attached to walls of the recess. For example, the elastomer spacer 500 may be attached to the proximal wall using an epoxy. The elastomer spacer 500 may be an O-ring. For example, the elastomer spacer 500 may be made of fluoroelastomer. In an aspect of the disclosure, the elastomer spacer 500 may have a durometer rating of less than 75 (Shore A). The elastomer spacer 500 is configured to compress when the welding plate 10 is torqued down to the fixturing 200.

In an aspect of the disclosure, the elastomer spacer 500 may be thin enough that the alignment pin 28, projecting from the proximal wall, is offset from the elastomer spacer 500. However, in other aspects, the elastomer spacer 500 may have a small through-hole for the alignment pin 28.

The tip 400 may be attached to the elastomer spacer 500. For example, the proximal end 415 of the tip may be attached to the distal end of the elastomer spacer 500. In an aspect of the disclosure, an epoxy (or another adhesive) may be used. While the tip 400 may be attached to the elastomer spacer 500, the tip 400 is not directly attached to walls of the recess 24. In this manner, each individual tip is "free-floating" within the recess 24 and has its own range of motion in the z direction when the welding plate 10 is torqued down on the fixturing 200 and in contact with the bus bar(s) 12.

The tip 400 may also be manufactured via 3-D printing. The tip 400 may be made of a rigid material such that it may exert pressure on the bus bar(s) 12 to provide the intimate contact. In some aspects of the disclosure, the base 20 and the tips 400 may be made of the same non-metallic material(s) such as described above. For example, the tip 400 may be made of G7 material or other fiber glass. However, other materials may be used. Similar to described above, the material may be selected based on the welding application and the thermal properties of the material.

Figure 4C:
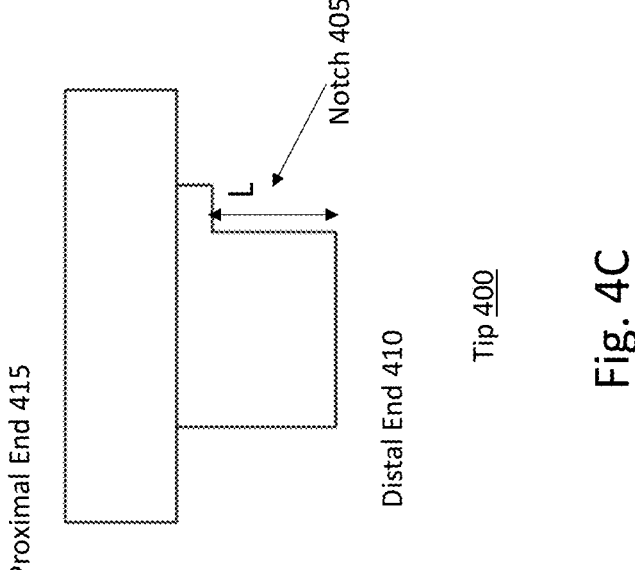
FIG. 4C is a sectional view of the tip in accordance with aspects of the disclosure.
Figure 5:
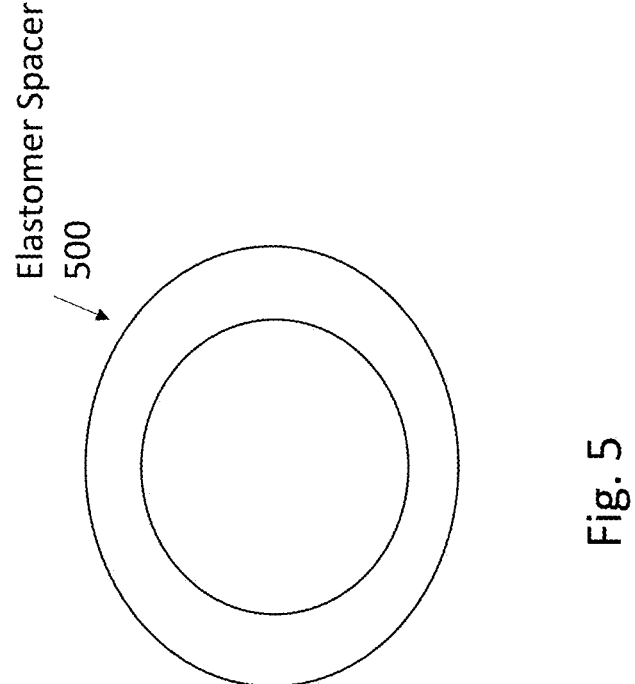
FIG. 5 shows an elastomer spacer in accordance with aspects of the disclosure.

FIGS. 4A-4C illustrate different views of an example of a tip 400 in accordance with aspects of the disclosure. The tip 400 has a proximal end 415 and a distal end 410. The proximal end 415 of the tip may be within the recess 24 and the distal end 410 may project from the recess 24. The proximal end 415 may be wider than the distal end 410.

In an aspect of the disclosure, a wall of the proximal end 415 may have orientation openings 420. Each orientation opening 420 may be configured and dimensioned to receive the alignment pin 28 of the recess 24 when the tip 400 is inserted into the recess 24. The orientation openings 420 enable the tip 400 to be mounted in one of two different orientations (e.g., a first orientation 705 or a second orientation 710). As shown in FIG. 4B, the proximal surface has two orientation openings 420. The depth of each opening in the z direction in the wall may be based on the length of the alignment pin 28 in the z-direction. For example, the openings 420 may extend through the proximal end 415 (through-hole). However, in other aspects, the openings 420 may be formed as a recess from the proximal surface and only extend partially through the proximal end 415. The orientation openings 420 may be arranged 180° from each other such that the first orientation 705 is rotated 180° from the second orientation 710.

In other aspects of the disclosure, instead of having two orientation openings 420 and each tip 400 being able to be mounted in one of two orientations, the tip 400 may have only one orientation opening 420. In this aspect of the disclosure, each tip 400 may be mounted in a dedicated orientation. However, the location of the orientation opening 420 in different tips 400 may be in a different position in the wall. For example, a first tip may have the orientation opening 420 180° from the orientation opening 420 of a second tip.

The tip 400 also has a central opening 425. The central opening 425 has substantially the same shape as the opening 26 in the base 20. The central opening 425 is also substantially aligned with the opening 26 in the z direction such that the light travelling through the opening 26 also travels through the central opening 425.

As shown in FIG. 4B, similar to openings 26 (shown in FIG. 3B), the central opening 425 has a central part that is a generally circular shape. The central opening 425 also has an extended portion, e.g., wings, extending from the central part of the central opening 425. The central part of the central opening 425 provides a welding channel for energy (light) from a welding laser 1000 to travel through the tip 400. Additionally, the central part of the central opening may be used for a height sensor to determine the height of a cell 800. The light from the welding laser 1000 may enter the tip 400 generally orthogonal. The central part of the central opening extends from the proximal end 415 to the distal end 410.

The extended portion (wings) of the central opening 425 provide a channel for energy (light) from weld monitoring laser 1005 to travel through and return from the bus bar 12/cells 800 such that the quality of the laser weld may be monitored. Given the angle that the light from the monitoring laser 1005 enters the tip 400, the extended portion may be tapered. The tapering may allow more light to come in at an angle and more specifically at the angle that the monitoring laser 1005 is oriented.

The distal end 410 of the tip 400 has a notch 405 (notch portion) where there is no material. Thus, the wall at the distal end 410 does not extend the full circumstance whereas a wall closer to the proximal end does. Diameter of the distal end 410 may be bus bar specific. The diameter is set to grab the edges of the tab 12A of bus bar to hold the tab down. If the diameter of the distal end 410 is too large, the tab 12A would sit inside the tip 400 and not be held down. Thus, the diameter may be set to maximize the contact area of the distal end 410 with the tab 12A. The distal end 410 has a horse-shoe cross section as viewed in the z direction from the distal end. The notch 405 is at the distal end 410 to enable the distal surface of the distal end to contact individual tabs 12A of the bus bar 12 and press against the individual cells 800 of the ESS. The notch 405 allows for the distal end of the tip 400 not to engage with the elbow 12B of the bus bar but at the same time have a large diameter to maximum the contact area.

The tabs 12A are bent toward the cells 800 from the elbow 12B. The length L (as shown in FIG. 4C), which is the height of the notch, allows for the proximal end of the notch to clear the elbow 12B of the bus bar (not contact). In an aspect of the disclosure, the proximal end of the notch 405 is within the cover 40 as shown in FIG. 8.

In an aspect of the disclosure, a bus bar 12 has different tab 12A/elbow 12B orientations. For example, half of the tabs 12A project from the elbow 12B in one direction and half of the tabs 12A project from the elbow 12B in another direction. Thus, in accordance with aspects of the disclosure, the tips 400 can have different orientations where in a first orientation 705, the notch 405 faces one direction and in the second orientation 710, the notch 405 faces another direction opposite of the one direction. However, in other aspects, the bus bar 12 may have all of the tabs 12A/elbows 12B facing the same direction and the tips 400 may also face the same direction.

Figure 6:
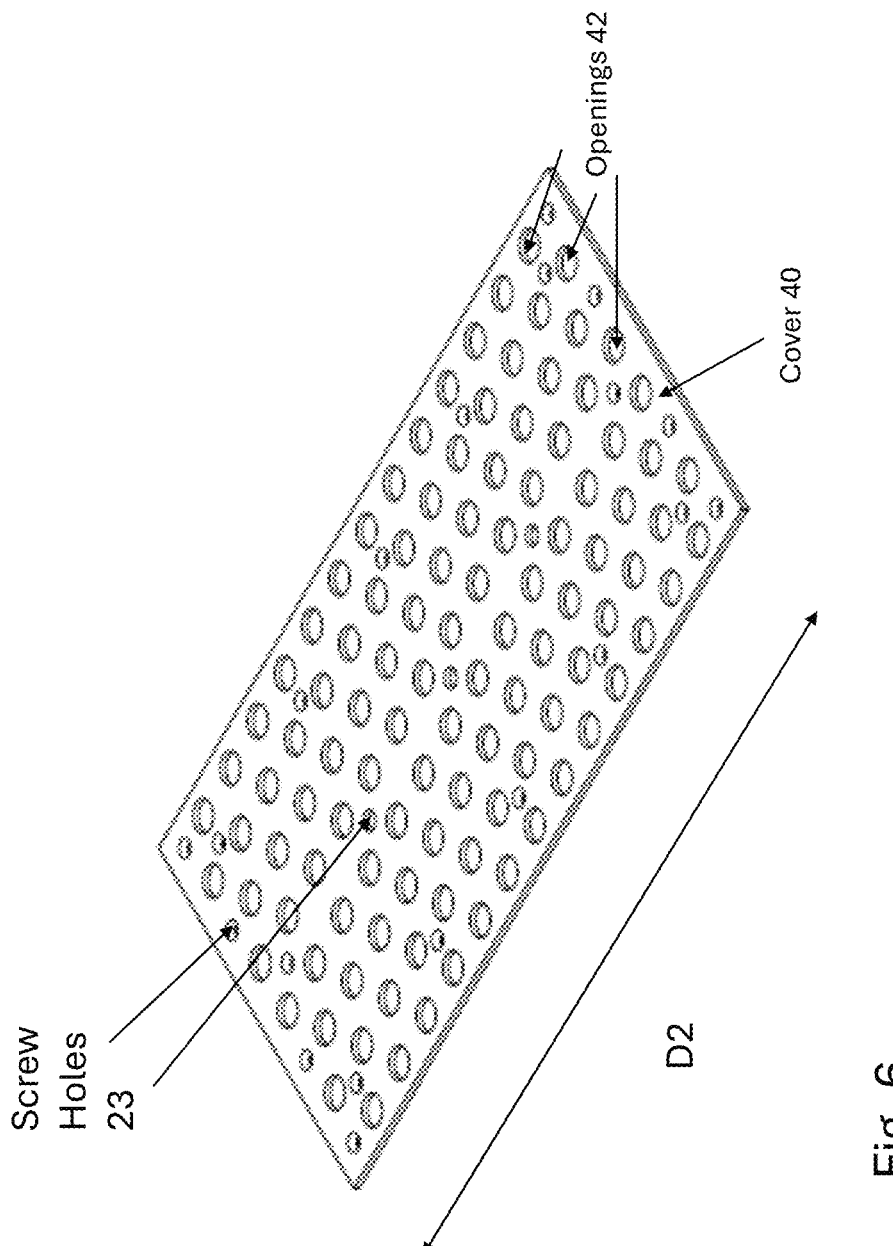
FIG. 6 is a perspective view of a cover for the welding plate in accordance with aspects of the disclosure.

FIG. 6 illustrates an example of the cover 40 of the welding plate 10. The cover 40 comprises a plurality of openings 42. The openings 42 are arranged in a matrix to oppose the plurality of recesses 24 in the base 20. The openings 42 are configured to receive the distal end 410 of the tip 400. Since the diameter of the distal end 410 is smaller than the recess 24, the diameter of the openings 42 in the cover 40 may be smaller than the diameter of the recesses 24.

Both the base 20 and the cover 40 also comprise additional openings (screw holes 23) for attaching the cover 40 to the base 20. For example, these additional openings may be screw holes 23 for screwing the cover 40 to the base 20 or vice versa. FIGS. 3A-3C and 6 show the additional openings (screw holes).

In an aspect of the disclosure, the length of the cover 40 (D2) may be smaller than the length of the base 20 (D1) such that the cover 40 only covers the area of the base 20 where the recesses 24 are located when the cover 40 is mounted to the base 20. In this manner, the mounting openings 22 on the base 20 are exposed and can be used to secure the welding plate 10 to the fixturing 200. In other aspects of the disclosure, the cover 40 may have an extended section with mounting openings 22 as well.

Figure 7A:
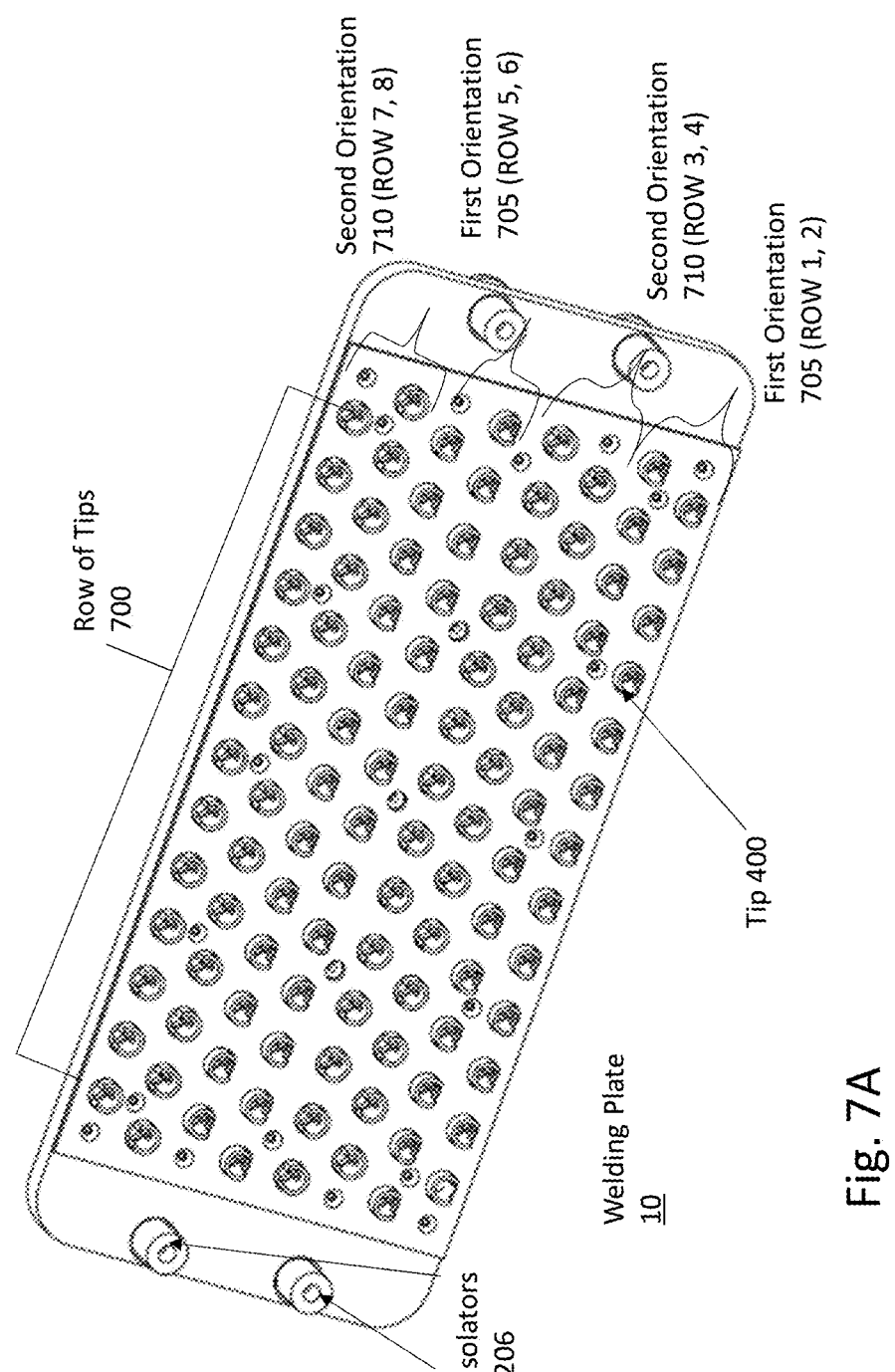
FIG. 7A is a perspective view of a welding plate in accordance with aspects of the disclosure showing the tips and orientation thereof.
Figure 7C:
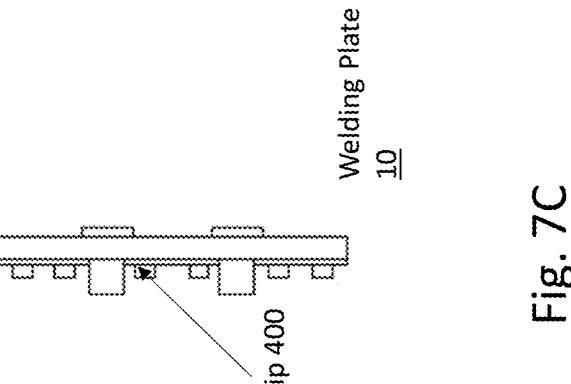
FIGS. 7B and 7C are end views of the welding plate in accordance with aspects of the disclosure.
Figure 7B:
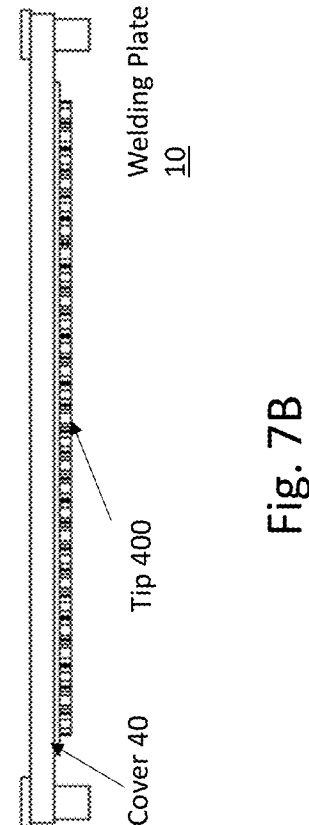

FIGS. 7A-7C illustrate different views of the welding plate 10 where the cover 40 is mounted to the base 20. The screws for mounting may be inserted into the screw holes 23 via the first side (proximal) or the second side (distal) of the plate 10.

As described above, the elastomer spacer 500 may be attached to the base 20 via an adhesive and the tip 400 may also be attached to the elastomer spacer 500; however, in other aspects of the disclosure, no adhesive may be used to attached either, but rather the cover 40 when attached to the base 20, holds the elastomer spacer 500 and the tip 400 in the recess 24 such that both may freely slide within recess 24 to provide the independent range of motion.

FIG. 7A shows a perspective view of an example of the welding plate 10 in accordance with aspects of the disclosure. In this view, the tips 400 are shown (side facing the bus bars 12). As shown, the tips 400 are arranged in a plurality of rows 700. For example, as shown, there are 8 rows of tips. However, the number of rows in the welding plate 10 is not limited to 8. In this example, tips 400 within the same row 700 are mounted to the base 20 with the same orientation (either the first orientation 705 or the second orientation 710). The orientation of the tips change based on a predefined pattern such that the notches 405 face the elbow 12B of the bus bar. The predefined pattern may change the orientation after a preset number of rows. The pattern and number of rows is based on the bus bar 12 configuration and orientation of the elbow 12B and tabs 12A in the bus bar. In the example shown in FIG. 7A, there is a change in orientation every 2 rows. For example, the orientation of tips in ROW 1 and ROW 2 is the first orientation 705 and the orientation of tips in ROW 3 and ROW 4 is the second orientation 710. This pattern is repeated for ROWs 5-8, e.g., tips in ROW 5 and ROW 6 have the first orientation 705 and tips in ROW 7 and the second orientation 710.

FIG. 7B shows the tips 400 projecting from the cover 40 and more specifically the distal end 410 of the tip 400 projects from the cover 40. FIG. 7B also shows the edge of the cover 40 and the length D2 of the cover 40 being shorter than the length D1 of the base 20. FIG. 7C also shows projecting tips 400.

FIG. 8 shows a sectional view when the welding plate 10 is mounted to the fixturing 200 and in a position for welding. The opening 26 in the base 20 aligns with the central opening 425 in the tip 40. The alignment forms the welding channel and height sensing channel. Also shown in FIG. 8 are the extended section or wings of both openings 26/425 which also align and form another sensing channel for sensing detecting the quality of the weld. In this view, the elastomer spacer 500 is compressed. In the compressed state, the distal surface (of the distal end 410 of the tip 400) exerts pressure (downward) on the tab 12A of the bus bar 12, which pushes the same on the cell 800.

FIG. 9 illustrates an example of a backer plate 15 which may be used in combination with a welding plate 10 in accordance with aspect of the disclosure to achieve the laser welding. The backer plate 15 comprises a plurality of fixed projections (fixed tip 900). The number of the fixed tips 900 equals the number of cells 800 in the ESS. Unlike, the tips 400 in the welding plate 10, these fixed tips 900 do not move based on the relative heights of the cells. The fixed tips 900 are arranged in a matrix in a similar manner as the cells 800. Along the periphery of the backer plate 15, there are mounting openings to secure the backer plate 15 to thread holes in the cell housing 805. The fixed tips 900 are intended to push the cell up to a certain height as the cells float in the cell housing between the capture plates 14 on either side.

A method for welding the bus bars 12 to the cells 800 will now be described. Initially, a set of bus bars 12 are inserted into the capture plate 14. For example, the tabs 12A are inserted into the openings in the capture plate 14. The number of bus bars 12 in the set may vary depending on the number of cells 800 and rows of cells in the ESS. For example, there may be four or six bus bars in the set. After the set of bus bars 12 are inserted, the backer plate 15 is placed over the bus bars 12 and torqued down to the cell housing 805 using hardware such as screws. Once the backer plate 15 is fixed into position (on a second side of the ESS and the cells 800 in the z direction), the ESS is flipped over to the other slide (first side of the ESS and the cells 800 in the z direction), and a sub-set of the bus bars for the first side are placed into the openings of the capture plate 14, e.g., tabs 12A are inserted. For example, the number of bus bars in the sub-set may be two. A welding plate 10 may be positioned over the sub-set of bus bars and torqued down onto the fixturing 200 as described above such as shown in FIG. 2. Since each tip 400 is independently moveable, the compression of the elastomer spacer 500 allows the tip 400 to slide within the recess 24 based on the height of the cells 800. The ESS is then mounted over the location mount 250 (fixture table) for welding. The height of each cell 800 is read by a sensor such as a laser sensor via the openings 26 and central opening 425.

Based on the sensed height, the height of the welding laser 1000 is controlled to affect the weld for each cell in contact with the sub-set of bus bars. The height is changed such that the laser 1000 fires at the same power and the same relative distance to the bus bar 12 despite of the varying heights of the cells 800. As shown in FIG. 10, the welding laser 1000 is directly over the opening/central opening 425 for the cell 800 that it is being welded to the bus bar 12. During the weld, a weld monitoring laser 1005 is monitoring the quality of the weld also via the opening 26/central opening 425 (albeit a different portion thereof). As shown in FIG. 10, the light (laser beam) from the weld monitor laser 1005 is offset from the light (laser beam) from the welding laser 1000 by a predetermined angle. For example, the angle may be about 45°. The welding laser 100, e.g., intensity and duration, may be controlled based on the output from the weld monitoring laser 1005. In some aspects of the disclosure, the welding laser 1000 may be a fiber laser. However, the welding laser 1000 is not limited to a fiber laser and other types of lasers such as, but not limited to, Nd:YAG (neodymium-doped yttrium aluminum garnet) laser or a $CO_2$ laser may be used. In some aspects of the disclosure, the monitoring laser 1005 may be a continuous wave laser or a pulse laser. In some aspects of the disclosure, the monitoring laser 1005 may be an infrared laser. However, the monitoring laser 1005 is not limited to an infrared laser, and other lasers, such as, but not limited to, visual light lasers (e.g., blue and green) may be used.

Once the welding is done for all of the cells 800 associated with the sub-set of bus bars, the welding plate 10 is removed from the fixturing 200 and the next sub-set of bus bars are inserted into the openings of the capture plate 14 (tabs 12A) for other cells 800. The welding plate 10 is then moved to cover the next sub-set of bus bars in a similar manner and torqued down to the fixturing 200 as described above and the welding process is repeated. The welding plate 10 may be removed, moved and installed for welding until all of the cells (on the same side are welded), e.g., the first side are completed.

Once the welding is done for the first side, the ESS is removed from the location mount 250 and flipped over to remove the backer plate 15. The ESS may be flipped over again to install the backer plate 15 on the first side, e.g., the side where the bus bars 12 are welded to the cells 800. The backer plate 15 may be installed on the first side as described above.

The welding process may be repeated for each sub-set of bus bars for the second side of the cells as described above. However, for welding on the second side, a different welding plate 10 with slidable tips may be used. In this welding plate 10, the orientation of the tips may be different, e.g., the opposite orientation. For example, if a tip 400 has a first orientation 705 in the welding plate for the first side, the tip 400 in the same position may have a second orientation 710 in the welding plate for the second side.

In the discussion and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein. For example, the term about when used for a measurement in mm, may include +/0.1. 0.2, 0.3, etc., where the difference between the stated number may be larger when the state number is larger. For example, about 1.5 may include 1.2-1.8, where about 20, may include 19.0-21.0.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

As used herein terms such as "a", "an" and "the" are not intended to refer to only a singular entity, but include the general class of which a specific example may be used for illustration. As used herein, terms defined in the singular are intended to include those terms defined in the plural and vice versa.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. A welding plate comprising:
a first portion comprises a plurality of recesses, each recess having a bottom wall, an elastomer configured to compress under force and disposed at the bottom wall of the recess, and a tip inserted therein, wherein the elastomer biases the tip for axial sliding movement between extended and retracted positions and where a proximal end of the tip is in contact with the elastomer; and
a second portion mounted to the first portion, the second portion having a plurality of first openings, each first opening corresponding to a recess, where a respective tip extends through a respective first opening, wherein each tip is slidably mounted within the welding plate, each tip having a central opening forming a welding channel.

2. The welding plate of claim 1, wherein the first portion further comprises a plurality of second openings, each second opening aligned with a recess, wherein each second opening is aligned with the central opening of the tip, each second opening forming a welding channel.

3. The welding plate of claim 2, wherein each second opening and the central opening of the tip further comprises an extended section configured to receive light from a monitoring laser for monitoring a quality of a weld.

4. The welding plate of claim 1, wherein the tip is configured to be mounted in one of a first orientation or a second orientation.

5. The welding plate of claim 4, wherein a wall of each tip comprises at least one opening and each recess comprises an alignment pin, wherein when the tip is inserted into the recess, the alignment pin is inserted into the opening in the wall of the tip defining the first or second orientation.

6. The welding plate of claim 4, wherein each tip in a same row of the welding plate has a same first or second orientation.

7. The welding plate of claim 6, wherein the orientation of the tips in a same row alternates every preset number of rows of tips.

8. The welding plate of claim 1, wherein a distal end of the tip has a horse-shoe shape.

9. The welding plate of claim 8, wherein the distal end of the tip has a notch region, a distal surface of the distal end is configured to engage a tab of a bus bar when welding, where a proximal end of the notch region is positioned above the bus bar.

10. The welding plate of claim 1, wherein the tip comprises a fiberglass material.

11. The welding plate of claim 1, wherein a target welding object is a bus bar, which is to be welded to cells of an energy storage system, where the tip contacts the bus bar, respectively, under a pressure of a backer plate when the welding plate is secured, where each tip slides within the corresponding recess and the elastomer is compressed, where an amount of sliding is based on heights of the corresponding cell.

12. The welding plate of claim 1, wherein the predetermined threshold is a shore A rating of 75.

13. A welding system for an energy storage system, the energy storage system having a cell housing comprising a plurality of cell openings for holding a plurality of cells, respectively, the plurality of cells mounted therein and a first plurality of bus bars and a second plurality of bus bars, the welding system comprising:
a first welding plate comprising:
a first portion comprises a plurality of recesses, each recess having a bottom wall, an elastomer configured to compress under force and disposed at the bottom wall of the recess, and a tip inserted therein, wherein the elastomer biases the tip for axial sliding movement between extended and retracted positions and where a proximal end of the tip is in contact with the elastomer; and
a second portion mounted to the first portion, the second portion having a plurality of first openings, each first opening corresponding to a recess, where a respective tip extends through a respective first opening, wherein each tip is slidably mounted within the welding plate, each tip having a central opening forming a welding channel, a distal end of the tips, when the first welding plate is mounted to the energy storage system, is configured to contact the first plurality of bus bars, the first welding plate further comprising a plurality of second openings, each second opening corresponding to a recess, wherein each second opening is aligned with the central opening of the tip, each second opening configured and dimensioned to form a laser welding channel,
a backer plate comprising a plurality of projections having equal lengths and aligned with the tips, the backer plate, when mounted to the energy storage device is configured to contact the second plurality of bus bars, and at least one of the monitoring laser or a welding laser.

14. The welding system of claim 13, further comprising a second welding plate, wherein tips in the first welding plate and the second welding plate are mounted in a first orientation or a second orientation where both orientations are present in the first welding plate and the second welding plate.

15. The welding system of claim 14, wherein the distal end of the tip has a notch region, a distal surface of the distal end of the tip is configured to engage a tab of the one of the first plurality of bus bars or the second plurality of bus bars and a proximal end of the notch region is above the same bus bar.

16. The welding system of claim 14, wherein each second opening and the central opening of the tip further comprises an extended section configured to receive light from the monitoring laser for monitoring a quality of a weld.

\* \* \* \* \*